United States Patent [19]

Carter

[11] Patent Number: 5,060,986

[45] Date of Patent: Oct. 29, 1991

[54] SLEEVE ADAPTER

[75] Inventor: William Carter, Marshfield, Mass.

[73] Assignee: Water Works Supply Corporation, Malden, Mass.

[21] Appl. No.: 502,049

[22] Filed: Mar. 30, 1990

Related U.S. Application Data

[63] Continuation of Ser. No. 281,101, Dec. 7, 1988, Pat. No. 4,976,457.

[51] Int. Cl.$^5$ ............................................. F16L 7/00
[52] U.S. Cl. ................................... 285/158; 285/337; 285/177; 285/231; 285/192; 52/220
[58] Field of Search ............... 285/158, 337, 230, 150, 285/288, 177, 56, 231, 192; 52/220

[56] References Cited

U.S. PATENT DOCUMENTS

| | | | |
|---|---|---|---|
| 952,602 | 3/1910 | Candee | 285/56 |
| 1,149,269 | 8/1915 | Klindt | 285/56 |
| 4,019,760 | 4/1977 | Streit | 285/158 X |
| 4,071,265 | 1/1978 | Wallace | 285/158 |
| 4,071,267 | 1/1978 | Davis . | |
| 4,076,281 | 2/1978 | Davis . | |
| 4,252,348 | 2/1981 | Kojima | 285/158 |
| 4,394,025 | 6/1983 | Anderson | 285/230 X |
| 4,648,631 | 3/1987 | Bryant | 285/337 X |
| 4,669,759 | 6/1987 | Harbeke | 285/158 |
| 4,694,513 | 9/1987 | Kiziah | 285/158 X |
| 4,909,519 | 3/1990 | Anderson | 285/230 X |
| 4,918,761 | 8/1990 | Harbeke | 52/220 X |
| 4,966,494 | 10/1990 | Inagaski et al. | 285/230 X |

OTHER PUBLICATIONS

Thunderline Corporation brochure, "Link-Seal Pipe to Wall Penetration Seals", (1985).
Thunderline Corporation, "Link-Seal Wall Sleeves".
Thunderline Corporation, "Century-Line Sleeves" (1985).

*Primary Examiner*—Dave W. Arola
*Assistant Examiner*—Carol I. Bordas
*Attorney, Agent, or Firm*—Hamilton, Brook, Smith & Reynolds

[57] ABSTRACT

A sleeve adapter (S) for locating a throughpipe (24) in a structural member (18). The sleeve adapter (S) comprises an annular apertured hub (2) having a central axis $\alpha$, a first annular surface (4) adjacent a first face of the hub (2) sloping inwardly toward the axis, a second annular surface (8) adjacent a second face of the hub (2), and a third annular surface (12) intermediate the first (4) and second (8) surfaces of a smaller diameter than the second annular surface (8). The adapter (S) also comprises a mechanical joint gasket (6) engaging the first annular surface (4) which locates a throughpipe (24) concentric with the central axis, a push-on gasket (10) engaging the second annular surface (8) which locates a sleeve pipe (14) concentric with the central axis, and a pressure device for urging the mechanical joint gasket (6) against the first annular surface (4) and the throughpipe (24). The sleeve adapter (S) optionally comprises a circumferential flange (16) adjacent the second face of the hub (2) which prevents liquid from seeping through the structural member (18).

1 Claim, 3 Drawing Sheets

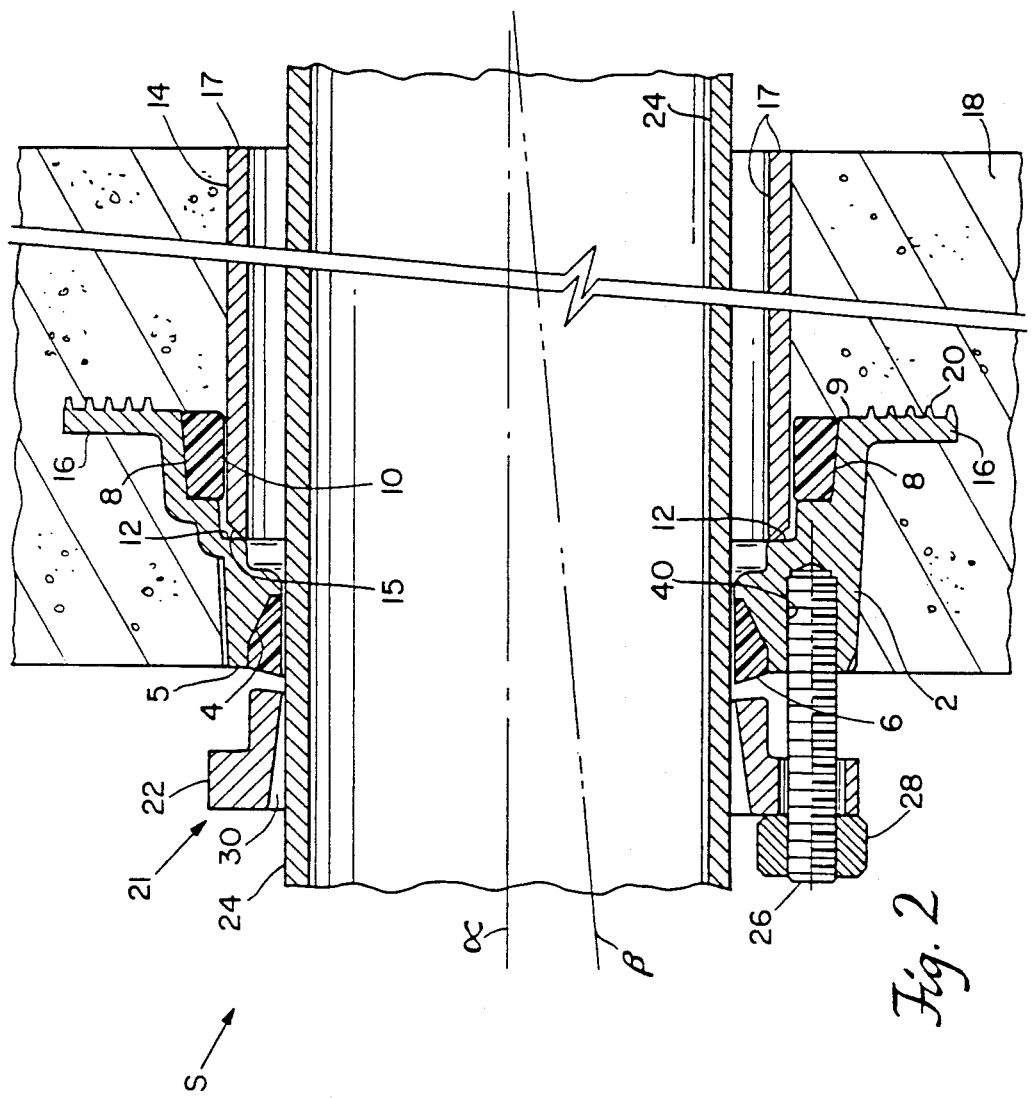

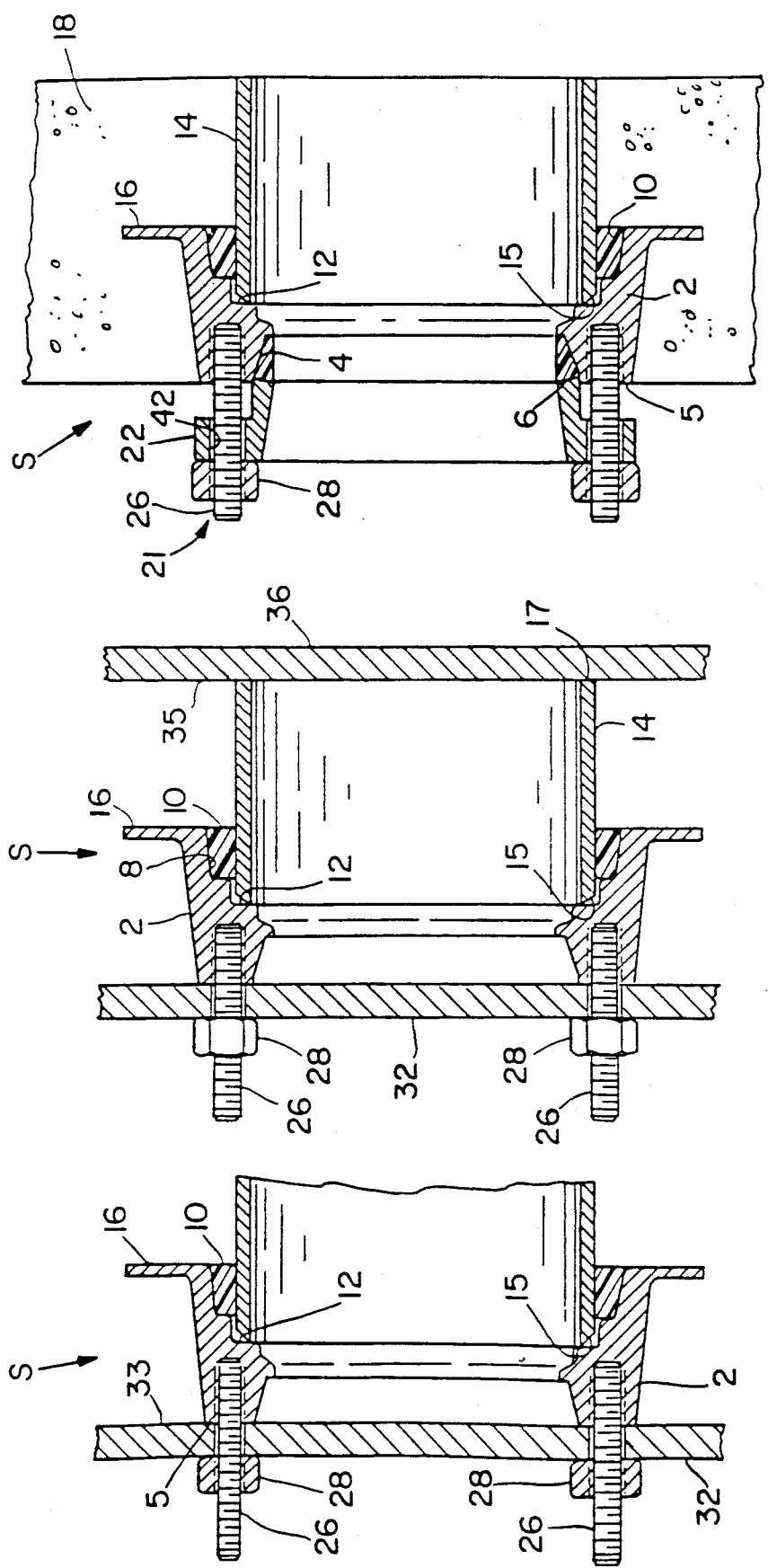

SLEEVE ADAPTER

This application is a continuation of application Ser. No. 07/281,101, filed Dec. 7, 1988, now U.S. Pat. No. 4,976,457.

FIELD OF THE INVENTION

The present invention relates to a sleeve adapter for use with pipes which carry gas, water or other fluids through structural members such as poured walls, floors, or ceilings.

BACKGROUND OF THE INVENTION

Cast iron, ductile iron, copper, plastic (e.g. pvc), and steel pipes in all sizes are commonly employed in systems handling water, gas and other fluids at varying pressures. A difficult task in the construction industry is the passing of these pipes through a structural member such as a poured wall or floor (for example concrete) which are found in sewage or water treatment plants, and the like. Such concrete walls or floors vary in thickness and require many pipe penetrations. A wall penetration is any device which is fitted in a wall or floor to accept a pipe or conduit.

Presently, three commonly employed means, called wall penetrations, for passing a pipe through a concrete wall or floor include: wall castings (which are monolithically cast), wall pipes (which are fabricated), and wall sleeves. Positioning these wall penetrations and keeping them in position prior to and during the pouring of a wall is a difficult and important task. Wall castings or wall pipes are capable of being positioned prior to the pouring of a wall since they can be attached directly to concrete formwork. After the concrete wall has been poured and set, the concrete form work is removed, and continuing piping is attached to one or both sides of the wall casting or wall pipe.

A disadvantage of wall castings or wall pipes is that it is difficult to position them in such a way that they are normal to the wall. Continuing pipe is attached to both sides of the wall casting or wall pipe so if the wall penetration is not normal to the wall, problems are encountered due to the angles of departure of the continuing pipes from either side of the wall casting or wall pipe, i.e., they are not square with or normal to the wall.

A wall sleeve may also be placed in the formwork of a concrete wall prior to the pouring of the wall; however, a wall sleeve differs from a wall casting in that the carrying pipe passes through the wall sleeve coaxially. A disadvantage of a wall sleeve is that there is no stable means for the positioning wall sleeve on the concrete formwork prior to pouring the wall. An advantage, however, of the wall sleeve (over a wall pipe or wall casting) is that the problems discussed above with respect to the continuing pipe are eliminated since the carrying pipe passes coaxially through the wall sleeve. A wall sleeve has the flexibility to straighten out or realign the throughpipe.

There are three common types of joints or connections commonly employed with wall penetrations and these are: mechanical joint, push-on joint and flanged. The mechanical and push-on joints are not restrained connections and are generally used for underground pipes where at least some flexibility is required due to the earth's movement or the building settling. The flanged joint is a restrained joint which can be used when flexibility is not a requirement of the joint.

The mechanical joint consists of a bell, a mating pipe, a sealing gasket, a follower gland with bolt holes, bolts and nuts. The bell is provided with an exterior flange having bolt holes and a socket having annular recesses for the sealing gasket and the plain end of the pipe. The bell can be cast as an integral part of the pipe or connecting piece or may be cast as an integral part of the wall casting. The bell end of the pipe slips over the plain end of a mating pipe section. Thus, the connection is formed when the plain end of the pipe is actually inserted into the bell end of the pipe provided with the gasket. This type of connection is commonly referred to as a "stuffing box" connection. After insertion of the plain end of the pipe, gasket compression is achieved externally between the pipe bell and the mating pipe barrel with a mechanical joint gland. The mechanical joint is designed for pipes and fittings ranging from two to fifty-four inches.

The second type of connection is the push-on joint. The push-on joint is a single gasket joint wherein the pipe or fitting is forced into a bell containing a continuous, molded, annular gasket. The gasket is contained and forms a seal with the entering pipe or fitting. The difference between the push-on joint and the mechanical joint is that the gasket in a push-on joint is compressed as the beveled plain end of the mating pipe is inserted.

The third type of connection is flanged. A flanged connection is annular with studs or bolts attached thereto which allows a similarly flanged continuing pipe or fitting to be bolted to it. This type of fitting has virtually no flexibility and is mostly used inside plants, pumping stations or other structures.

There are several wall castings or wall sleeves which use the above described joints or connections. Wallace, in U.S. Pat. No. 4,071,265 issued Jan. 31, 1978, describes a threaded mechanical joint wall sleeve. The mechanical joint wall sleeve of Wallace comprises a cylindrical member and a pair of flanged end members or adapters. Each end member is adapted to receive a gasket which provides a seal with the carrying pipe which is inserted into the wall sleeve. The threaded mechanical joint wall sleeve of Wallace has to be threaded prior to its use on the field. Thus, pipe ends which are normally disposed of on the field cannot be used.

Davis, in U.S. Pat. No. 4,071,267, issued Jan. 31, 1978, describes a shrouded pipe wall casting for use with split-clamp couplings which is designed for use in concrete walls. The length of the wall casting is equal to the wall thickness and the ends are grooved for use with standard split clamp coupling. In the shrouded pipe wall casting of Davis, a water stop is integrally cast with the shroud which is welded to the pipe. Again, the grooved ends of the wall casting of Davis '267 are grooved prior to its use on the field.

Davis in U.S. Pat. No. 4,076,281, issued Feb. 28, 1978, describes a wall casting which is a threaded mechanical-joint bell fitting for use with cast iron pipe which passes through concrete walls. The mechanical-joint bell fitting of Davis is threaded so it can be screwed onto a threaded end of a carrying pipe section. The fitting comprises an integral bolting flange around the bell and optionally includes a circumferential water stop flange. Davis does not teach the attachment of the fitting directly to the concrete formwork but does teach the use of a support structure which is bolted to the concrete footings or slab.

Another type of wall penetration commonly employed is a wall sleeve which is provided with a ring of rubber-links which forms a seal between the wall sleeve and a carrying pipe which passes therethrough coaxially. The rubber-links are bolted together to form a seal which is a continuous circle.

When constructing large buildings such as sewage and water treatment plants, there have always been problems encountered when pipes pass through poured walls or floors, such as concrete walls or floors. First, a pressure differential builds up across a wall which may cause leakage problems after extended use. Second, the wall castings and wall pipes presently employed are difficult to obtain and very expensive since these wall penetrations have to be either monolithically cast or fabricated to a particular size depending on the thickness of the wall. Third, wall castings and wall pipes have to lie normal with the wall since continuing pipe is attached to the wall penetration. This can be a problem since it is very rare that a wall is poured perfectly even. Fourth, even though a wall sleeve is more flexible than a wall casting or wall pipe, it is very difficult to position wall sleeves on the formwork prior to the pouring of a wall.

Means for penetrating a poured wall or floor is needed which counteracts a pressure differential across a wall, is easily and inexpensively obtained, is capable of being positioned on formwork with accuracy without a tendency towards slippage, and does not have to lie perfectly flush with a poured wall.

SUMMARY OF THE INVENTION

The invention resides in a sleeve adapter for locating a throughpipe in a structural member. The sleeve adapter comprises an annular apertured hub having a central axis. It has a first annular surface adjacent a first face of the hub sloping inwardly toward the axis, and a second annular surface adjacent a second face of the hub. There is third annular surface intermediate the first and second surfaces which has a diameter smaller than the second annular surface.

The sleeve adapter also includes a mechanical joint gasket engaging the first annular surface which locates a throughpipe concentric with the central axis. There is a push-on gasket engaging the second annular surface which locates a sleeve pipe concentric with the central axis and pressure means for urging the mechanical joint gasket against the first annular surface and the throughpipe. The sleeve adapter optionally comprises a circumferential flange adjacent the second face of the hub which prevents liquid from seeping through the structural member.

The annular apertured hub is an important component of the sleeve adapter. The first annular surface of the hub is for receiving and positioning a mechanical joint gasket, the second annular surface is for receiving and positioning a push-on gasket, and the third annular surface is for engaging the end of the sleeve pipe.

The sleeve adapter of this invention has advantages over the wall sleeves presently employed. The annular apertured hub can be bolted directly to formwork which prevents dislocation during pouring of a structural member. This attachment capability also provides a positive means of locating a position on forms. Labor cost for installation is reduced since additional pieces are not necessary to support the wall penetration prior to and during the pouring of a structural member. Further slippage does not occur. The circumferential flange can be integrally cast with the annular apertured hub which reduces material and labor costs by eliminating an extra piece of the adapter system and eliminating the labor of welding a circumferential flange on the hub. An integrally cast circumferential flange also overcomes the leakage problems encountered with a welded circumferental flange. The adapter system enjoys a positive mechanical joint type seal which is suitable for pressures up to 250 psi.

The sleeve adapter of this invention also has advantages over wall castings and wall pipes. Pipe ends which are normally disposed of can be used within the adapter, (i.e. the pipe ends for wall pipes have to be threaded and therefore cannot be cut on the field like those of the present invention). The adapter possesses mechanical joint deflection allowance (i.e. 4° to 5° C., for example) therefore it is much more flexible than a wall pipe or wall casting can straightening out or realigning a throughpipe. The throughpipe can be restrained with mechanical joint retaining glands which are common in the industry so there is no need to obtain devices which would be more expensive and more difficult to obtain. Wall castings are monolithically cast to a particular size and wall pipes have to be fabricated or machined to a particular size which adds to expense and limits availability. The pieces of the sleeve adapter system can be cut and sized on the field.

The above and other features of the invention including various novel details of construction and combinations of parts will now be more particularly described with reference to the accompanying drawings and pointed out in the claims. It will be understood that the particular sleeve adapter embodying the invention is shown by way of illustration only and not as a limitation of the invention. The principles and features of this invention may be employed in varied and numerous embodiments without departing from the scope of the invention.

BRIEF DESCRIPTION OF DRAWINGS

FIG. 2 is a cross-sectional view taken on the line II—II of FIG. 1 of the sleeve adapter positioned in a structural member.

FIGS. 3(A)-(C) show the assemblage of the sleeve adapter system prior to, during and after the pouring of a structural member, respectively.

DETAILED DESCRIPTION OF THE INVENTION

Figure 1:
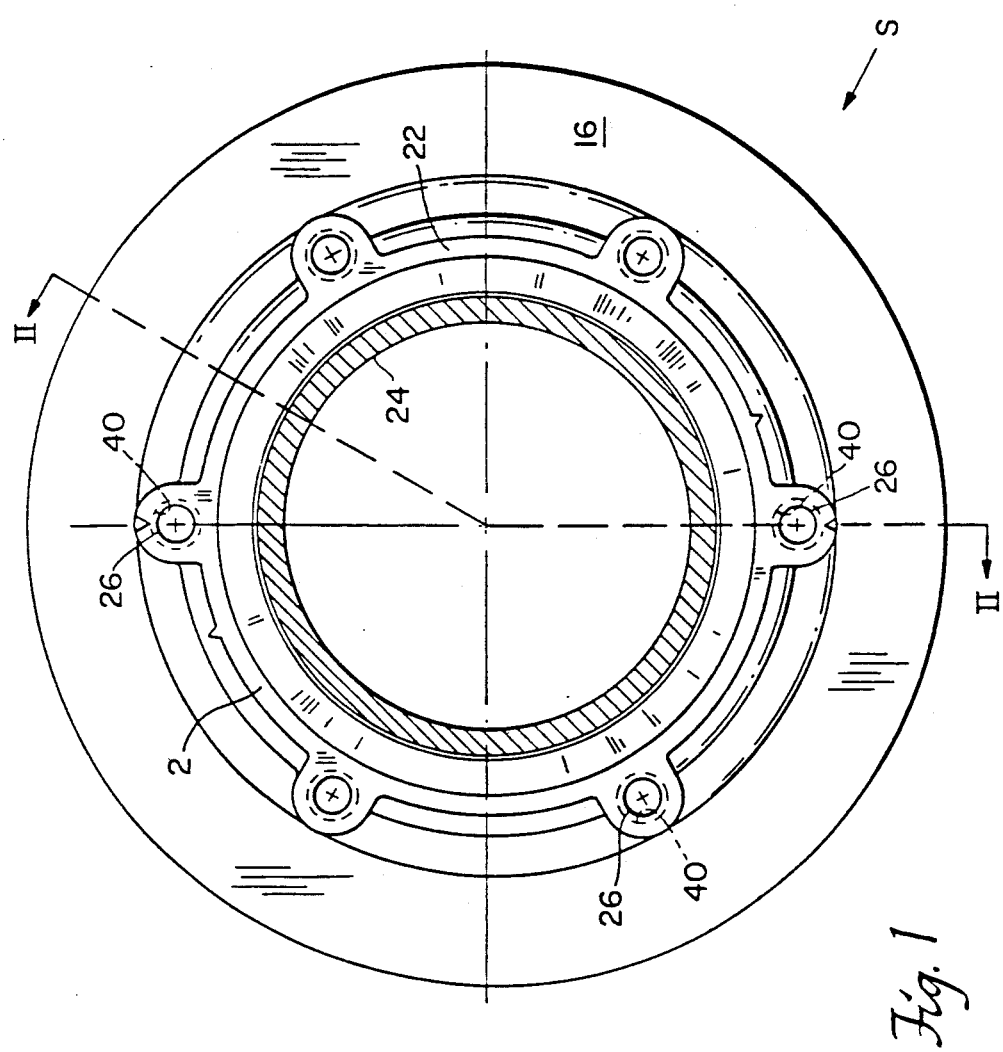
FIG. 1 is a front view of the annular apertured hub integrally cast with a circumferential flange and mounting a mechanical joint gasket made in accordance with the present invention.

Referring to FIG. 2, a sleeve adapter S will be seen which comprises an annular apertured hub 2 having a first annular surface 4 adjacent a first face 5 of the hub. The first annular surface 4 slopes inwardly towards the central axis o of the hub when measured in a direction away from the face 5 inwardly of the hub 2. This first annular surface 4 is for receiving, positioning, and ultimately shaping a mechanical joint gasket 6.

The hub 2 also has a second annular surface 8 adjacent a second face 9 of the hub 2 for receiving a push-on gasket 10. The annular surface 8 also slopes inwardly toward the axis α but opposite to the surface 4.

A third annular surface 12 is formed intermediate the first and second annular surfaces 4,8 and has a diameter smaller than the second annular surface 8. It is formed essentially normal to the axis α. It is engagable with the end of a sleeve pipe 14 to position it lengthwise of the axis.

The hub 2 is preferably integrally cast with a circumferential flange 16 which serves as a waterstop by preventing liquids from seeping through voids in the structural member 18. The circumferential flange 16 may or may not have annuli 20. The annuli 20 provide additional surface area which aids in sealing the adapter S to the substance of which the structural member 18 is comprised thereof. When the circumferential flange 16 is integrally cast on the hub 2, the preferred embodiment, there is no possibility of leakage through weldments.

A pressure means, generally indicated 21 illustrated as a mechanical joint gland 22, urges the mechanical joint gasket 6 against the first annular surface 4 to slope it and force it axially inward to forcibly engage a throughpipe 24. A seal between the mechanical joint gasket 6 and the throughpipe 24 is thus formed. The mechanical joint gland 22 can be urged against the gasket 6 by using studs 26 and nuts 28. The elasticity of the mechanical joint gasket 6 and the clearance 30 between the gland 22 and the pipe 24 is provided by the mechanical joint gland 22 and allows the through pipe 24 to be aligned or realigned as for example, from an axis B which is not normal to the structural member 18 to the desired normal position wherein the central axis α is normal to the structural member.

FIGS. 3(A)-C) demonstrate the assembly process of the sleeve adapter S for locating a throughpipe 24 in a structural member 18. FIG. 3A shows the annular apertured hub 2 attached to formwork 32 prior to the pouring of a structural member 18 (FIG. 3C). The sleeve adapter S is assembled prior to being attached to the formwork 32. The push-on gasket 10 is received by the second annular surface 8 of the annular apertured hub 2. One end 1,5 of the sleeve pipe 14 abuts the third annular surface 12 of the annular apertured hub 2. The studs 26 which extend from the first face 5 of the hub 2 pass through the formwork 32. The nuts 28 are tightened on the studs 26 urging the first face 5 of the hub against the inner surface 33 of the formwork thereby providing a positive means for ultimately positioning the hub 2 in the structural member 18.

FIG. 3B shows the sleeve adapter S assembled and attached to the formwork 32 as it would be assembled during the pouring of a structural member 18 (FIG. 3C). The second end 17 of the sleeve pipe 14 abuts the inner surface 35 of the formwork 36.

FIG. 3C shows sleeve adapter S in the structural member 18 after the structural member 18 has been poured and set and the formwork 32 has been removed. At this point, the mechanical joint gasket 6 is received by the first annular surface 4 of the annular apertured hub 2 and a mechanical joint gland 22 urges the mechanical joint gasket 6 against the first annular surface 4. The mechanical joint gland 22 is attached to the annular apertured hub 2 via the studs 26 which extend from the first face 5 of the hub 2 which pass through bores 42 in the mechanical joint gland 22 and are which is fastened using nuts 28.

The components of the sleeve adapter (i.e. annular apertured hub 2, pressure means 21, and sleeve pipe 14) can be made of any material capable of carrying gases, liquids, and slurries. Examples of such materials are grey iron or ductile iron (the two forms of cast iron) steel, plastic (i.e., pvc), fiberglass, stainless steel, copper or copper alloys (i.e., bronze).

The annular apertured hub 2 may include a circumferential flange 16 adjacent to the second face 9 of the hub 2. This flange 16 can be welded or integrally cast with the hub, preferably integrally cast. The flange 16 has dual functionality in that it prevents liquid from seeping through the structural member and aids in sealing the sleeve adapter to the substrate the structural member. The circumferential flange 16 optionally comprises annuli 20 which are concentric with the central axis o and serve to increase the surface area of the circumferential flange 16.

The throughpipe 24 can be any pipe capable of carrying gases, liquids, or slurries. The structural member 18 can be a wall, floor, or ceiling made of a substance which is poured as a liquid or slurry and eventually hardens or sets to form the structural member. Examples of such substances are concrete, plaster, and cement.

The mechanical joint and push-on gaskets 6,10 used with this invention are annular and can be made of any appropriate elastomer. Examples of such elastomers are neoprene and rubber. The elasticity of the gaskets allow the throughpipe 24 to be pivoted for alignment with the central axis.

The pressure means 21 may be any means capable of urging the mechanical joint gasket 6 against the hub 2 and throughpipe 24. Examples of such means 21 are ferrels and glands. The preferred pressure means 21 is a mechanical joint gland 22 movable towards the hub 2 longitudinally along the central axis α which is engagable with the mechanical joint gasket 6.

I claim:

1. A unitary, one piece, annular apertured hub for a sleeve adapter, the hub having a central axis and a first annular surface adjacent a first face of the hub sloping inwardly toward the axis for receiving a mechanical joint gasket;

a second annular surface adjacent a second face of the hub sloping outwardly away from the central axis for receiving a push-on gasket;

the second annular surface having a diameter greater than the first annular surface;

a third annular surface intermediate the first and second annular surfaces and having a diameter smaller than the second annular surface for engaging the end of a sleeve pipe;

the third annular surface having a diameter larger than the first annular surface such that the sleeve pipe may be spaced further from the axis in a radial direction than the mechanical joint gasket; and a circumferential flange extending outwardly from the second face and integral with the hub, the circumference of the flange being larger than every other configuration formed on the one-piece hub, including annuli which increase the surface area of the circumferential flange.

* * * * *